United States Patent [19]

Hart

[11] 4,320,179
[45] Mar. 16, 1982

[54] TRANSFERENCE AND PURIFICATION OF HALOGEN AND HYDROHALIC ACID IN AN ELECTROCHEMICAL SYSTEM

[75] Inventor: Thomas G. Hart, Royal Oak, Mich.

[73] Assignee: Energy Development Associates, Inc., Madison Heights, Mich.

[21] Appl. No.: 892,692

[22] Filed: Apr. 3, 1978

[51] Int. Cl.$^3$ .............................................. H01M 8/06
[52] U.S. Cl. ...................................... 429/15; 429/17; 429/21; 204/103; 204/128
[58] Field of Search ........................ 429/9, 15, 17, 21; 204/128, 103

[56] References Cited

U.S. PATENT DOCUMENTS

| 3,486,994 | 12/1969 | Donges et al. | 204/128 |
| 3,635,804 | 1/1972 | Gritzner et al. | 204/128 |
| 3,713,888 | 1/1973 | Symons | 429/51 |
| 3,993,502 | 11/1976 | Bjorkman | 429/21 |
| 4,053,376 | 10/1977 | Carlin | 204/103 |

Primary Examiner—Donald L. Walton
Attorney, Agent, or Firm—Ostrolenk, Faber, Gerb & Soffen

[57] ABSTRACT

Halogen and hydrohalic acid are transferred and purified in an auxiliary electrochemical cell divided into two compartments by a permselective membrane, one compartment containing a low chlorine oxidation overvoltage electrode and the other compartment containing a low chlorine reduction overvoltage electrode.

16 Claims, No Drawings

TRANSFERENCE AND PURIFICATION OF HALOGEN AND HYDROHALIC ACID IN AN ELECTROCHEMICAL SYSTEM

BACKGROUND OF THE INVENTION

In electrochemical energy storage systems which employ chlorine and/or hydrochloric acid as the chemical components, gas impurities such as carbon dioxide and oxygen evolve from the electrodes and mix with chlorine gas. Additionally, impurities such as iron, manganese, titanium, vanadium and many other metallic and non-metallic impurities leach out of the electrodes and structural components into the electrolyte. When the level of impurities reaches a given degree, the performance of the electrochemical system is adversely affected and if the impurities cannot be economically removed, the contaminated chlorine and the contaminated electrolyte must be replaced. The cost of this replacement can be a considerable burden on the overall economic operation of an electrochemical energy storage system or, indeed, any other process which depends upon high purity chlorine and/or high purity hydrochloric acid. The present methods of transferring and purifying chlorine and hydrochloric acid are cumbersome and expensive.

It is accordingly the object of this invention to provide a facile, inexpensive and simple method and apparatus for the transfer and purification of halogen and/or hydrohalic acid in conjunction with electrochemical energy storage systems which employ halogen and/or hydrohalic acid as chemical components. This and other objects of the invention will become apparent to those skilled in the art from the following detailed description.

SUMMARY OF THE INVENTION

This invention relates to a method for transferring and purifying halogen and/or hydrohalic acid and the apparatus used in such method. More particularly, halogen and/or hydrohalic acid is transferred and purified by the employment of an auxiliary electrochemical cell which is divided into two compartments by a permselective membrane, one of the compartments containing a low halogen oxidation overvoltage electrode and the other compartment containing a low halogen reduction overvoltage electrode.

DESCRIPTION OF THE INVENTION

The instant method for the transferance and purification of halogen and/or hydrohalic acid is an electrochemical method particularly adapted for use in electric energy storage systems and depends on the facility with which electrical current is transported through a permselective membrane by cations such as hydrogen ions. The method employs an auxiliary electrochemical cell in addition to the main electochemical cell of the electric energy storage system. The principal cell can be that of a zinc/halogen/zinc halide battery described, e.g., in Simmons U.S. Pat. No. 3,713,888, a hydrogen halide cell such as that described in U.S. Pat. No. 1,847,435, or any other electrochemical energy storage system which employs halogen such as chlorine, bromine or iodine and/or hydrohalic acid such as HCl, HBr and HI. For convenience, reference will be made to Cl and HCl in the following.

The auxiliary cell contains two electrodes, one of which has a low chlorine oxidation overvoltage and the other of which has a low chlorine reduction overvoltage. The invention is not restricted with respect to the material forming the oxidation and reduction electrodes and any suitable materials can be used. It has been found that ungraphitized carbon is a particularly suitable choice as the material for both electrodes.

The two electrodes are maintained in two separate but adjoining compartments which are created by the imposition of a permselective membrane between the two electrodes. The membrane must be characterized by being substantially impermeable to dissolved chlorine yet offer small impedement to ionic transfer and by resisting the separate and combined corrosive effects of the chlorine, other electrolytic products and the electrolyte. It has been found that the cation permselective membranes produced in accordance with the U.S. Pat. No. 3,282,875 satisfy each of these requirements for a variety of systems including zinc/chlorine, hydrogen/chlorine, and sodium/chlorine. The two compartments are arranged so that an electrolyte can circulate in and out of the compartments and around and/or through the electrodes. The electrolytes circulating through the compartment must contain chloride and, additionally, the electrolyte circulating by or through the reduction electrode must also contain chlorine, preferably dissolved therein.

The auxiliary cell can be interposed in the electrolyte supply to the basic electrochemical cell of the electrochemical energy storage system or in the product removal system of such a cell, or in both, as will become apparent below.

The auxiliary cell is operated in slightly different fashion dependent on whether chlorine purification, chlorine transfer, hydrochloric acid purification, hydrochloric acid transfer or various combinations of such purification and transfer are desired.

If chlorine purification and transfer is desired, a suitable chloride containing electrolyte such as hydrochloric acid (which is a solution of hydrogen chloride in water) is circulated through both cell compartments. The chlorine gas needing purification is continuously dissolved in the hydrochloric acid circulating through the compartment containing the chlorine reduction electrode. A voltage is applied in order to maintain the chlorine reduction electrode potential negative with respect to the chlorine oxidation electrode potential by a sufficient amount to pass a reasonable current. The magnitude of the potential difference is a function of a variety of factors including the material of the electrodes, the concentration of the chloride containing electrolyte, the concentration of chlorine in the electrolyte, etcetera. For any given system, the appropriate potential difference is easily determined by a few simple experiments. For example, in the case of a chlorine saturated 10% strength hydrochloric acid at normal temperature and pressure flowing around and through the reduction electrode at 1.0 ml/min/cm$^2$ and of electrode area, a voltage of about 300 millivolts will easily sustain a current of 300 milliamps per cm$^2$. In this case, the action of the current flow through the cell is as follows: (a) the dissolved chlorine is converted to chloride ion at the reduction electrode (per Faraday's law at the rate of about 1.2 grams per ampere hour), (b) hydrogen ions from the hydrochloric acid in the oxidation electrode compartment move through the permselective membrane into the reduction electrode compartment at substantially the same rate as chloride ions are produced at the reduction electrode, and (c) chloride ions in the oxidation electrode compartment are converted to chlorine by the oxidation electrode at substantially the same rate as the dissolved chlorine in the reduction electrode compartment is converted to chloride ions.

The net results of the three actions just described is that pure chlorine is continually extracted from the hydrochloric acid in the oxidation compartment at approximately the same rate as impure chlorine is continually dissolved into the hydrochloric acid in the reduction compartment. Thus, the apparent result of the operation of the auxiliary cell is that chlorine is "transferred" from the reduction compartment to the oxidation compartment and in the course of such "transfer", the chlorine is "purified". The purity of the pure chlorine obtained depends mainly on the purity of the hydrochloric acid in the oxidation compartment.

The chlorine will be transferred into the oxidation compartment even though the pressure in the oxidation compartment may be substantially above the pressure in the reduction compartment. Only an additional 50 millivolts of voltage is requred to overcome a chlorine pressure difference of 100 psi. As is apparent, the cell structure and particularly the permselective membrane must be capable of withstanding the pressure differences. The cell process where the chlorine is apparently transferred from low to high pressure is extremely energy efficient and can be used instead of a mechanical compressor for chlorine compression and liquefaction with or without the purification function if so desired. In general, pressure differentials of up to about 1000 psi, and preferably within the range of about 20-150 psi can be employed.

It will be recognized that at the same time chlorine purification and transfer as described above is being effected, hydrochloric acid purification and transfer is also being effected. Thus, the hydrochloric acid dilutes in the oxidation compartment and concentrates in the reduction compartment continually as the chlorine is dissolved in the reduction compartment and evolved in the oxidation compartment. Hence, hydrogen chloride apparently "transfers" from the oxidation compartment into the reduction compartment, i.e., in the opposite direction to the chlorine "transfer".

If the chlorine evolved in the oxidation compartment is recirculated around and redissolved in the reduction compartment, the only obvious change in cell chemical components is the hydrogen chloride transfer. Therefore, in the chlorine recirculation situation, the auxiliary cell functions as a hydrogen chloride transfer cell. The recirculating chlorine does not carry over significant amounts of non-volatile impurities into the reduction compartment. As a result, if the oxidation compartment is periodically or continually replenished with relatively impure hydrochloric acid, relatively pure hydrochloric acid may be periodically or continually withdrawn from the reduction compartment. In the latter situation, therefore, the cell functions as a hydrochloric acid purification cell.

Examples of the manner in which the auxiliary cell can be incorporated into an electrochemical energy storage system are as follows.

In a zinc-chlorine battery described, e.g., in the aforesaid Simmons Patent, the chlorine gas evolved during charge is dissolved into the hydrochloric acid in the reduction compartment of the auxiliary cell at ambient pressure and is thence transferred into the oxidation compartment as heretofore described. The chlorine evolved can be transferred to appropriate apparatus for conversion into chlorine hydrate as described in the aforementioned patent. Alternatively, the pressure in the oxidation compartment can be maintained at a level sufficient to liquefy the chlorine as it is evolved and the liquid chlorine removed for compact storage. When the voltage on the chlorine transfer cell is reversed, the chlorine can be transferred out of storage into the ambient pressure compartment (now the oxidation electrode compartment) for discharge of the zinc-chlorine battery.

In a hydrogen chlorine battery, the chlorine in the gas above the liquid chlorine is periodically transferred through the auxiliary cell and the remainder of the gas, which does not transfer, and is therefore not chlorine, is periodically vented from the system. In this way, a purification of the chlorine is effected.

As an example of hydrogen chloride transfer, the hydrogen chloride is transferred into the zinc chloride electrolyte of the zinc chlorine battery referred to above for pH control purposes. In order to achieve this result, zinc chloride electrolyte circulating from the zinc chlorine battery system is circulated through the reduction electrode compartment and the oxidation electrode compartment contains hydrochloric acid which is periodically or continually replaced as the hydrogen chloride transfers and the acid thereby dilutes. The two compartments can be at the same pressure and, as explained above, chlorine recirculates around the two compartments so that there is no net consumption of chlorine in the hydrogen chloride transfer process.

In operating the auxiliary cell as a hydrochloric acid purification cell, the contaminated acid is periodically or continually added to and circulated through the oxidation compartment. Pure hydrochloric acid is periodically or continually withdrawn from the reduction compartment. The extent of concentration achieved in the reduction compartment and the extent of dilution allowed in the oxidation compartment will partially determine the electrical energy consumption per unit of acid which is purified. For example, a concentration of pure acid up to 25% by weight and a dilution of impure acid to 5% by weight may be the optimum depending on the cost of electric energy and the cost of pure hydrochloric acid. Operation of the cell at elevated pressure so as to facilitate chlorine solution in the reduction compartment, to raise the amount of chlorine dissolved in the reduction compartment, and to reduce the chlorine bubble size in the oxidation compartment will result in lower power consumption. The lowest power consumption is obtained by operating above the chlorine liquefaction pressure so that the chlorine recirculation is by means of liquid chlorine. The liquid chlorine dissolves directly into the acid in the reduction compartment without passing through the gas phase. There is, of course, no net consumption of chlorine in the hydrochloric acid purification.

The auxiliary cell of the present invention can be operated to simultaneously effect chlorine transfer and hydrochloric acid transfer as follows. In a hydrogen-chlorine electrochemical energy storage system, hydrogen chloride is electrolysed to and from hydrogen and chlorine by two electrodes—a hydrogen electrode, which is typically platinum, and a chlorine electrode, which is typically carbon. In one such battery, the hydrogen electrode and the chlorine electrode are separated by a permselective membrane which serves principally to keep the hydrogen separate from the chlorine. Greater efficiencies can be achieved in such a hydrogen chlorine battery if the change in concentration of the hydrochloric acid due to the electrolysis can be held to a minimum in the chlorine electrode compartment of the battery. It is also advantageous from the point of view of safety and control if the chlorine concentration in the hydrochloric acid at the chlorine electrode can be maintained below saturation. A further safety advantage can be realized if the chlorine storage can be buffered from the hydrogen chlorine cell. All of these advantages can be obtained by disposing the chlorine-hydrogen chloride transfer cell of the present invention between the hydrogen chlorine cell and the hydrochloric acid and chlorine storage so as to provide a buffer preventing direct communication between the storage and the cell. In this buffering arrangement, the chlorine generated in the hydrogen chlorine cell is transferred through the auxiliary transfer cell into storage rather than being transferred directly into storage. Simultaneously, as hydrogen chloride is consumed in the hydrogen chlorine cell, hydrogen chloride is transferred from hydrochloric acid storage through the auxiliary transfer cell and into the hydrogen chlorine cell. Conversely, chlorine consumed in the hydrogen chlorine cell is transferred from the storage thereof through the auxiliary transfer cell into the hydrogen chlorine cell. Simultaneously, hydrogen chloride generated in the hydrogen chlorine cell is transferred from the cell through the auxiliary transfer cell into storage. In both the charge and discharge situations referred to above, the total electrical current flow through the transfer cell is about the same as that through the hydrogen chlorine cell.

In some types of electrochemical energy storage systems, there is an advantage to operating the auxiliary cell only a part of the time. For example, charge efficiency is less important than discharge efficiency in an automobile battery and the auxiliary transfer cell might conveniently operate only during charge for the main purpose of reducing the chlorine concentration in the bulk hydrochloric acid. Also in such mobile battery applications, the transfer cell might advantageously be completely bypassed some of the time and partially bypassed for the remainder of the time. Partial bypass would, of course, result in a lower current through the auxiliary transfer cell than through the hydrogen chlorine cell and permit the use of a smaller transfer cell.

The instant transfer cell differs in three principal ways from a hydrochloric acid electrolysis cell. First, the present cell employs two chlorine electrodes while an electrolysis cell requires a hydrogen electrode. Secondly, the electrolysis cell does not require an electrolyte containing dissolved chlorine on the reduction side in contrast to the inventive cell which has such a need. Finally, the HCl electrolysis cell electrolyzes the electrolyte while the transfer cell electrolyzes the chlorine.

It will be appreciated that the various embodiments of the invention which have been described above have been set forth for illustration purposes only and have not been intended to limit this invention. Various changes and modifications can be made in the process and apparatus described without departing from the spirit and scope of the invention.

I claim:

1. A method of transferring or purifying at least one of halogen and hydrohalic acid which comprises providing a transfer cell comprising a housing having a permselective membrane dividing said casing into a first and second compartment, a low halogen oxidation overvoltage electrode in said first compartment and a low halogen reduction overvoltage electrode in said second compartment; circulating a halide containing electrolyte through said first compartment; circulating a halide containing electrolyte containing halogen through said second compartment; and establishing a potential difference between said oxidation and reduction electrodes, wherein said halides and halogen are the same element, and there is no net consumption of halogen.

2. The method of claim 1 wherein a pressure differential between said first and second compartments is maintained.

3. The method of claim 2 wherein said pressure differential is up to about 1000 psi.

4. The method of claim 3 wherein said pressure differential is about 20–150 psi.

5. The method of claim 1 wherein said halogen is chlorine and chlorine produced in said first compartment is cycled to said second compartment.

6. In a method of operating an electrochemical energy storage system by supplying a chloride containing electrolyte to an electrochemical cell, electrolyzing said electrolyte in said electrochemical cell, and removing the electrolysis products from said electrochemical cell, the improvement which comprises interposing the transfer cell of claim 1 in at least one of the electrolyte supply and electrolysis product removal.

7. The method of claim 6 wherein said auxiliary cell is interposed in both said electrolyte supply and said electrolysis product removal.

8. The method of claim 6 wherein a pressure differential between said first and second compartments is maintained.

9. The method of claim 6 wherein said halogen is chlorine, and said chloride containing electrolytes contain hydrogen chloride.

10. A transfer cell capable of transferring or purifying at least one of halogen and hydrohalic acid comprising a housing, a permselective membrane dividing said housing into first and second compartments, a low halogen oxidation overvoltage electrode in said first compartment, a low halogen reduction overvoltage electrode in said second compartment, means to create a potential difference between said halogen oxidation and halogen reduction electrodes, means to circulate a halide-containing electrolyte through said first compartment, and means to circulate a halide-containing electrolyte containing halogen through said second compartment wherein said halides and halogen are the same element, and there is no net consumption of halogen.

11. The transfer cell of claim 10 further comprising means to create a pressure differential between said first and second compartments.

12. The transfer cell of claim 10 further comprising means to circulate halogen generated in said first compartment to said second compartment.

13. In an electrochemical energy storage system comprising an electrochemical cell wherein a halide containing electrolyte is electrolyzed, means to supply said electrolyte to said electrochemical cell, and means to remove electrolysis products from said electrochemical cell, the improvement which comprises the transfer cell of claim 10 interposed between said electrochemical cell and at least one of said means to supply and means to remove.

14. The electrochemical energy storage system of claim 13 wherein said transfer cell is interposed between said electrochemical cell and both of said means to supply and means to remove.

15. The electrochemical energy storage system of claim 13 further comprising means to create a pressure differential between said first and second compartments.

16. The electrochemical energy storage system of claim 13 further comprising means to circulate halogen generated in said first compartment to said second compartment.

* * * * *